Patented Apr. 26, 1938

2,115,564

UNITED STATES PATENT OFFICE 2,115,564

PROCESS OF DECOLORIZING RESINS

Charles A. Thomas, Frank J. Soday, and Wallene R. Derby, Dayton, Ohio, assignors, by mesne assignments, to Monsanto Chemical Company, a corporation of Delaware No Drawing. Application July 31, 1935, Serial No. 34,062

2 Claims. (Cl. 260—2)

This invention relates to a process for treating hydrocarbon resins and similar resins to effect the removal of the major portion of the substances which impart color thereto.

The principal object of the invention is to provide a method for lightening the color and increasing the resistance to discoloration and weathering of resins resulting from the treatment of constituents of cracked petroleum distillates with anhydrous aluminum chloride and other catalysts of the Friedel-Crafts type as well as resins from other sources, particularly coumarone-indene resins.

Another object of the invention is to provide a new improved method for the production of resins from hydrocarbon constituents of cracked petroleum distillates which resins are characterized by light color and increased resistance to discoloration and weathering, especially in atmospheres containing acid and smoke fumes.

A third object of this invention is to produce a resin from constituents of cracked petroleum distillates with properties superior to those heretofore available, such improvements being manifested in color, solubility, resistance to acids, alkalies and atmospheric weathering, and possessing remarkable reactivity or combining power with drying and non-drying oils.

The methods of producing hydrocarbon resins by treatment of cracked petroleum distillates with promoters of the Friedel-Crafts type are described in numerous patents and applications of Charles A. Thomas and/or Carroll A. Hochwalt, of which No. 1,836,629 of December 15, 1931 is particularly pertinent hereto. In general, the method consists in agitating for a short period of time a suitable dried hydrocarbon distillate with a small proportion of an anhydrous metallic halide or other catalyst used in Friedel-Crafts reactions. The catalyst is then removed by the addition of an alcoholic ammonia solution or with such other suitable substances which cause the precipitation of both the metallic portion of the metallic halide and the halide portion as compounds insoluble in the resulting mixture. The insoluble precipitated compounds and any insoluble compounds formed in the reaction promoted by the metallic halide catalyst are filtered off. The clear filtrate, containing the resin in solution, is then evaporated to such a point that the remaining resin has the desired hardness. In some cases additional hardening and enhanced properties are obtained in the resin by removing any high-boiling oils which may have been retained therein after the final evaporation by a treatment with superheated steam, whereby the oils are removed by volatilization with the steam.

The types of hydrocarbons which are suitable for the production of such unsaturated hydrocarbon resins include olefins, diolefins, aromatic hydrocarbons, alkylated aromatic hydrocarbons, and terpenes, all of which, with the possible exception of terpenes, occur to a greater or lesser extent in cracked petroleum distillates. The reactions by which the resins are formed are complex but include the condensation or combination of a member of one class of the hydrocarbons mentioned with a member of another class, accompanied by polymerization of the individual unsaturated hydrocarbons and/or polymerization of the condensed hydrocarbon products. In speaking of these multiple reactions which are comprehended in terms such as combination, condensation, mutual polymerization, co-polymerization, multiple polymerization, and the like, it has been considered advantageous to designate them in the one simple term polymerization, which term throughout this specification is to be understood to have that broad significance.

Resins produced by the processes outlined above sometimes are of dark color and possess properties short of those desired for use under various severe conditions, although entirely satisfactory for the many uses.

It has now been found that the resin can be improved in color by treatment in solution in a suitable solvent with fuming sulphuric acid. To carry out such a treatment the resin is dissolved in petroleum naphtha and a suitable quantity of fuming sulphuric acid is added thereto, the quantity depending upon the degree of lightening desired. The mixture is agitated, the sludge is allowed to settle and the clear liquid is decanted. From this clear liquid the sulphuric acid is removed by adsorbent clays or other materials which are added thereto and agitated therewith and then finally filtered off. The liquid thus freed from acid is evaporated in the usual manner to recover the resin. Usually less than 10 per cent (of the weight of the resin in solution) of fuming sulphuric acid containing 30 per cent sulphur trioxide is quite sufficient to produce a lightening satisfactory for most purposes.

Further, it has been found that the decolorization and resin-forming process can be combined in a one-step process by following the procedure outlined hereafter: The cracked petroleum distillate is agitated with the metallic halide catalyst in the usual manner. Instead of removing the metallic halide after the reaction with a base, fuming sulphuric acid is added directly thereto, the quantity depending upon the degree of decolorizing desired. The addition of the acid causes a precipitation of the metallic halide as salts insoluble in the liquid. The excess acid is removed with adsorbent clays or other materials as before, which are added directly to the liquid containing the other insoluble materials. The mixture is filtered to remove the salts of the metallic halide precipitated by the acid, any insoluble products formed in the reaction promoted by the metallic halide, and the clay or other material containing the excess acid, and the clear filtrate is evaporated to recover the resin. The advantages of such a one-step procedure as compared to the former two-step method are obvious: It avoids the use of a reagent for the removal of the metallic halide, there is but one evaporation of a large volume of solution to resin instead of two such evaporations and there is but one filtration operation instead of two, such as are required in the simplest procedure by which a resin can be made and subsequently decolorized in two steps by the use of sulphuric acid.

In another embodiment of the invention the acid is added directly to the adsorbent clay. The resin in solution is then warmed with the acidulated clay and subsequently filtered therefrom. The clear filtrate can then be evaporated until hard brittle resin remains.

Although the use of clay and fuming sulphuric acid for the production of mineral oils consisting predominately of saturated hydrocarbons is well known in the art, there was no reason to suppose that such treatments were applicable to hydrocarbon resinous polymers of an unsaturated nature, that is, resins formed by the polymerization of unsaturated hydrocarbons with Friedel-Crafts promoters; such resins exhibit considerable unsaturation in that their iodine numbers are approximately in excess of 150. That such hydrocarbon resins do not yield appreciable quantities of sulphonated or oxidized products by this treatment with fuming sulphuric acid was also unexpected in view of the tendency of monomeric unsaturated hydrocarbons to form sulfate esters. In addition, there is evidenced no noticeable further increase or decrease in the degree of polymerization of such resins after treatment with fuming sulphuric acid. Contrary to reactions of unsaturated compounds with sulphuric acid, there is observed no appreciable further polymerization or depolymerization, sulphonation, sulphation or oxidation and there is no substantial lowering in the degree of unsaturation of the resin after treatment. There is no appreciable change in the iodine number of the resin after treatment with fuming sulphuric acid nor is its combining power or reactivity with oils decreased. The resins after treatment combine equally well with castor and other vegetable oils as before treatment, according to the methods described in the patents of Charles A. Thomas and Carroll A. Hochwalt, No. 2,023,495; 2,039,364; 2,039,365; 2,039,366 and 2,039,367.

Fuming sulphuric acid with a 30 per cent content of sulphur trioxide has been mentioned as a reagent for use in this improved process but acid with a higher concentration of sulphur trioxide gives even better decolorizing action. On the other hand, similar beneficial results but somewhat less powerful decolorizing powers have been observed with the use of ordinary concentrated sulphuric acid, syrupy phosphoric acid and chlorosulphonic acid. The quantities to be used are dependent upon the extent of decolorization desired but approximately may be said to be less than 20 per cent by weight of the resin in solution. Good results have been obtained with as little as 1 per cent but the effectiveness of the reagent appears to have been passed when 15 per cent of fuming sulphuric acid of 30 per cent sulphur trioxide content was used.

In carrying out the treatment with the decolorizing reagent, the resin solution is preferably left in contact therewith for periods varying from 10 minutes to 2 hours or more.

In removing the reagent from the resin solution, substances such as adsorptive clays, fuller's earth, activated carbon or charcoal, bases such as sodium hydroxide, calcium hydroxide, and salts with neutralizing properties, such as sodium carbonate, calcium carbonate and sodium sulphite have been found useful. Better and more effective decolorization is obtained when using clay by warming the solution of resin containing the sulphuric acid and clay after treatment.

The amount of adsorbent clay or other absorbing agent to use for the removal of the acid treating agent can be varied over wide ranges. However, it is desirable to keep the quantity as small as possible. Usually from 1 to 2 parts by weight to 1 part of resin in solution is sufficient, but these quantities are dependent upon the dilution of the solution. When using the clay in the one-step process heretofore described the clay is apportioned according to the anticipated yield of resin.

In practicing this invention the solution of resin should contain approximately 1 gram of resin to about 5 cubic centimeters of petroleum naphtha or other solvent, or similar proportions. Solutions of greater concentration may be too viscous for suitable manipulation whereas the use of more dilute solutions requires the addition of greater quantities of clay for removal of the acid after treatment.

To aid in filtering the acid-treated liquid containing suspended substances and/or clay, the use of filter aids such as Filter Cel, or even lime or chalk, can be used.

Examples of the method of carrying out the process of this invention follows:

Example 1

A cracked kerosene distillate obtained by cracking above 825° C., rich in diolefines and having the following distillation characteristics was used: 57% at 100° C.; 89% at 95°/50 mm.; 100% at 125°/50 mm. To 1000 c. c. of this distillate was added in small portions with continual stirring, 15 grams of anhydrous aluminum chloride, the temperature being maintained at about 20° C. After agitating for 1 hour, 60 c. c. of an alcoholic ammonia solution prepared by mixing 60 parts by volume of 95% alcohol and 40 parts by volume of ammonium hydroxide of specific gravity 0.90, were added. The resulting suspended material was removed by filtration and the clear filtrate was evaporated until hard brittle resin remained. The resin weighed 167 grams and had a color of 9 on the Barrett scale.

To 500 c. c. of petroleum naphtha were added 100 g. of resin prepared above which was dissolved with warming and stirring. The resulting solution was divided into 5 portions, each containing 20 g. of resin. To one portion was added 0.2 gram of sulphuric acid containing 30 per cent sulphuric trioxide, corresponding to 1 per cent of the resin weight. To another portion was added 0.6 gram of the same acid, to the third portion was added 1.6 grams of acid, to the fourth portion was added 2.4 grams of acid, and to the fifth portion, 5 grams of acid, corresponding to 3, 8, 12 and 25 per cent of the resin weight, respectively. These mixtures were shaken for about 10 minutes and the resulting sludges were allowed to settle. The resin solutions were then decanted from the sludges and to each portion was then added 40 grams of Attapulgus clay and then was heated to about 70° C. Each portion was filtered hot, the filtrate being poured through the residue on the filter if it was not clear. The resulting clear filtrates were then separately evaporated to hard resin. The yields recovered in this treatment varied from 50 per cent of the original resin weight to almost 100 per cent, the lower yields corresponding to the highest concentrations of acid used in the treatment.

The colors varied from 2 on the Barrett scale for that resin treated with 1 per cent by weight of sulphuric acid containing 30 per cent sulphur trioxide to a color of 1 for that with 8 per cent of acid, but beyond this the sample treated with 25 per cent acid was darker than that treated with 12 per cent. The color of the resin treated with 12 per cent of acid was the same as that treated with 8 per cent of acid, being 1, whereas that treated with 25 per cent of acid had a color of 1.5. All of the samples treated with acid, however, had a much lighter color than the original, which was 9.

The iodine values of the resins treated with acid were substantially the same as that of the untreated sample, being approximately 150. All the treated resins had a slightly lower melting point and all combined with oil, that is, when heated with an equal weight of a mixture of equal parts of tung oil and castor oil to about 300° C. they formed tough, non-tacky products.

*Example 2*

Twenty grams of the resin prepared in Example 1 were dissolved in 100 c. c. of petroleum naphtha. To this solution was then added at room temperature 1.6 grams of chlorosulphonic acid. The mixture fumed. After standing for a short period of time the resin solution was decanted from the sludge. To the resin solution were added 50 grams of Attapulgus clay and the resulting suspension was warmed to about 70° C. and filtered as before. The clear filtrate was then evaporated to hard brittle resin, which had a color of 2. The resin also combined with oils, as described in Example 1 and had substantially the same iodine number.

*Example 3*

To a solution of 20 grams of a resin similar to that prepared in Example 1, having a color of 7 on the Barrett scale, was added 40 grams of fuller's earth to which had been added 15 per cent by weight of sulphuric acid containing 30 per cent sulphur trioxide. The resulting suspension was stirred and warmed to about 50° C. and filtered. The clear filtrate was evaporated to hard resin, its color being 1.5.

*Example 4*

To a solution of 20 grams of a resin similar to that prepared in Example 1, having a color of 7 on the Barrett scale, was added 1 gram of sulphuric acid containing 60 per cent sulphur trioxide. The mixture was shaken for 10 minutes and then allowed to stand. The resin solution was decanted from the sludge and to it were then added 10 grams of powdered chalk. The mixture effervesced slightly. The mixture was then filtered and the clear filtrate was evaporated to hard resin. The resin obtained had a color of 2.

*Example 5*

To 1000 c. c. of the same cracked distillate used in Example 1 were added 15 grams of anhydrous aluminum chloride in small portions. The mixture was stirred and maintained at about 20° C. during the course of about 1 hour. To the resulting suspension were added 16 grams of sulphuric acid containing 30 per cent sulphur trioxide, followed by 300 grams of Attapulgus clay. The resulting suspension was warmed to about 40° C. and filtered. The clear filtrate was evaporated to hard resin. The yield of resin was 135 grams and its color was 2 on the Barrett scale.

Although the above examples constitute preferred embodiments of the invention, the invention is not to be limited thereto, it being understood that modifications and alterations may advantageously be made to meet individual requirements and that such changes do not depart substantially from the invention which is defined in the appended claims.

What we claim is:

1. The method which comprises mixing a liquid hydrocarbon solution of an unsaturated hydrocarbon resin obtained by the polymerization of a cracked petroleum distillate rich in olefins, diolefins and aromatic hydrocarbons and having a distillation end-point not substantially above 125° C. at 50 mm. pressure, in the presence of a Friedel-Crafts catalyst, and which resin is soluble in gasoline and benzene but insoluble in alcohol and acetone, with fuming sulfuric acid of sufficient strength and in sufficient quantity to combine with color-imparting impurities associated with the resin in solution and insufficient to combine with a substantial part of the dissolved unsaturated resin product or to affect substantially the iodine number thereof, and separating the hydrocarbon solution of the resin so treated from the resulting acid sludge.

2. The method which comprises mixing a liquid hydrocarbon solution of an unsaturated hydrocarbon resin obtained by the polymerization of a cracked petroleum distillate rich in olefins, diolefins and aromatic hydrocarbons and having a distillation end-point not substantially above 125° C. at 50 mm. pressure, in the presence of a Friedel-Crafts catalyst, and which resin is soluble in gasoline and benzene but insoluble in alcohol and acetone, with fuming sulfuric acid of sufficient strength and in sufficient quantity to combine with color-imparting impurities associated with the resin in solution and insufficent to combine with a substantial part of the dissolved unsaturated resin product or to affect substantially the iodine number thereof, mixing the resulting mixture with sufficient solid adsorbent of the type of clay to neutralize residual acid remaining in said solution, and separating the hydrocarbon solution of the resin so treated from the solid adsorbent.

CHARLES A. THOMAS.
FRANK J. SODAY.
WALLENE R. DERBY.